United States Patent
Razdan et al.

(10) Patent No.: US 6,253,301 B1
(45) Date of Patent: Jun. 26, 2001

(54) METHOD AND APPARATUS FOR A DEDICATED PHYSICALLY INDEXED COPY OF THE DATA CACHE TAG ARRAYS

(75) Inventors: Rahul Razdan, Princeton; David A. Webb, Jr., Groton; James B. Keller, Waltham, all of MA (US); Derrick R. Meyer, Austin, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/061,626

(22) Filed: Apr. 16, 1998

(51) Int. Cl.⁷ ...................................................... G06F 12/15
(52) U.S. Cl. ................................ 711/202; 711/3; 711/203
(58) Field of Search ................................ 711/3, 202, 203, 711/206, 216

(56) References Cited

U.S. PATENT DOCUMENTS

| | | | |
|---|---|---|---|
| 4,551,797 | 11/1985 | Amdahl et al. | 364/200 |
| 4,727,482 | 2/1988 | Roshon-Larsen et al. | 364/200 |
| 4,731,739 | 3/1988 | Woffinden et al. | 364/200 |
| 5,418,922 | * 5/1995 | Liu | 711/3 |
| 5,515,522 | * 5/1996 | Bridges et al. | 711/141 |
| 5,579,503 | * 11/1996 | Osborne | 711/119 |
| 5,603,004 | * 2/1997 | Kurpanek et al. | 711/118 |
| 5,978,886 | * 11/1999 | Moncton et al. | 711/118 |
| 6,038,647 | 3/2000 | Shimizu | 711/168 |

OTHER PUBLICATIONS

"Efficient Hardware Functions for Higher Performance Computers," M.V. Ramakrishna, E. Fu, and E. Bahcekalli, IEEE Transactions on Computers, vol. 46, No. 12, Dec. 1997, pp 1378–1381.*

* cited by examiner

Primary Examiner—Matthew Kim
Assistant Examiner—Christian P. Chace
(74) Attorney, Agent, or Firm—Hamilton, Brook, Smith & Reynolds, P.C.

(57) ABSTRACT

A data caching system and method includes a data store for caching data from a main memory, a primary tag array for holding tags associated with data cached in the data store, and a duplicate tag array which holds copies of the tags held in the primary tag array. The duplicate tag array is accessible by functions, such as external memory cache probes, such that the primary tag remains available to the processor core. An address translator maps virtual page addresses to physical page address. In order to allow a data caching system which is larger than a page size, a portion of the virtual page address is used to index the tag arrays and data store. However, because of the virtual to physical mapping, the data may reside in any of a number of physical locations. During an internally-generated memory access, the virtual address is used to look up the cache. If there is a miss, other combinations of values are substituted for the virtual bits of the tag array index. For external probes which provide physical addresses to the duplicate tag array, combinations of values are appended to the index portion of the physical address. Tag array lookups can be performed either sequentially, or in parallel.

7 Claims, 5 Drawing Sheets

METHOD AND APPARATUS FOR A DEDICATED PHYSICALLY INDEXED COPY OF THE DATA CACHE TAG ARRAYS

BACKGROUND OF THE INVENTION

In general, main memory access is relatively slow compared to central processing unit (CPU) execution times. Therefore, most CPU architectures include one or more caches. A cache is a high-speed memory which can be associated with a small subset of referenced main memory. Because most memory reference patterns only require a small subset of the main memory contents, a relatively smaller, high-speed cache can service many of the memory references.

For example, instruction caches can improve efficiency because often in software programs a small section of code may be looping. By having the instructions in a high-speed, local instruction cache, they are accessed much faster. Data caches can likewise improve efficiency because data access tends to follow the principle of locality of reference. Requiring each access to go to the slower main memory would be costly. The situation can be even worse in a multi-processor environment where several CPUs may contend for a common bus.

Data cache systems in some configurations comprise both a data store and a tag array. The data store holds data copied from the main memory. Each tag array location holds a tag, or physical page address, for a block of consecutive data held in the data store in association with the tag location.

During a memory access, a virtual page address from the CPU core is translated by a page translator into a physical page address. The remainder of the address, or a portion thereof, is used to index into the tag array. The tag retrieved from the indexed tag array is compared with the translated physical page address, a match indicating that the referenced data is in the data store. A mismatch indicates that the data will have to be retrieved from main memory. Page translation occurs in parallel with the tag array lookup, minimizing delay.

A need also exists in multiprocessor systems to test the contents of the data cache system from outside the CPU. Several processors may reference the same physical address in memory. Besides looking up its own local cache, each CPU must check the caches of other CPUs in the system. Failure to do so would result in data incoherency between the individual caches as each CPU reads and writes to its own local copy of the same data from main memory.

To prevent this incoherency, a CPU sends "probes" to other CPUs during a memory reference. Each data cache system receiving a probe uses a physical address provided by the probe to look into its own tag array. If the data resides in its data store, the data cache system responds to the probing CPU accordingly allowing ownership arbitration to take place.

SUMMARY OF THE INVENTION

A problem with the physically-addressed, physically-tagged data caching system in a virtually-addressed computer architecture as described above is that the cache is limited to the size of a memory page. This results because address bits which are not part of the page address are the only unmapped bits and thus are the only bits that can be used to index the cache. As capacity for larger caches grows, the size limitation takes on greater import.

The present invention resolves this problem by indexing the tag array and data cache using virtual page address bits with the assumption that the bits used to index the tag array are the same for the corresponding physical page address. If the assumption is correct, a cache hit is correctly detected. This enables a four-fold increase in the size of the cache in one embodiment.

Another problem with the prior art is contention for the tag array. Functions external to the CPU core, such as probes from other CPUS, contend with the CPU core's own need to access the tag array. Whenever the tag array is servicing a probe, the tag array is unavailable to the CPU core to determine if data the CPU core needs is in the data store. Therefore the CPU core has to wait for the probe to be serviced. The present invention resolves this by providing a duplicate tag array to service the probes.

Accordingly, a preferred embodiment of the present invention comprises a data store for caching data from a main memory, a primary tag array for holding tags associated with data cached in the data store, and a duplicate tag array for holding copies of the tags held in the primary tag array. The duplicate tag array is accessible by external functions such as probes so that the primary tag array remains available to the processor core.

A page address from a memory address provided by an external probe is compared with a tag read from the duplicate tag array location indexed by the index portion of the memory address. If there is a match, the data addressed by the memory address is currently cached in the data store. Otherwise the output indicates that the addressed data is not currently cached in the data store.

The preferred embodiment of the present invention comprises an address translator which maps virtual page addresses of virtual addresses to physical page addresses, wherein a virtual address comprises a virtual page address and an unmapped index portion. A tag array holds tags associated with the data cached in the data store, and is referenced by indexes comprising portions of the virtual page addresses and unmapped index portions. A physical page address is compared with tags read from the tag array, a match indicating a hit. If there is a miss, other possible values are substituted for the virtual portion of the index in order to check other possible tag array locations for a hit.

The tags can be read and compared by sequentially substituting for the virtual portion of the index until a match is detected indicating a hit, or alternatively and preferably, multiple tags are read and compared in parallel using a plurality of comparators.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
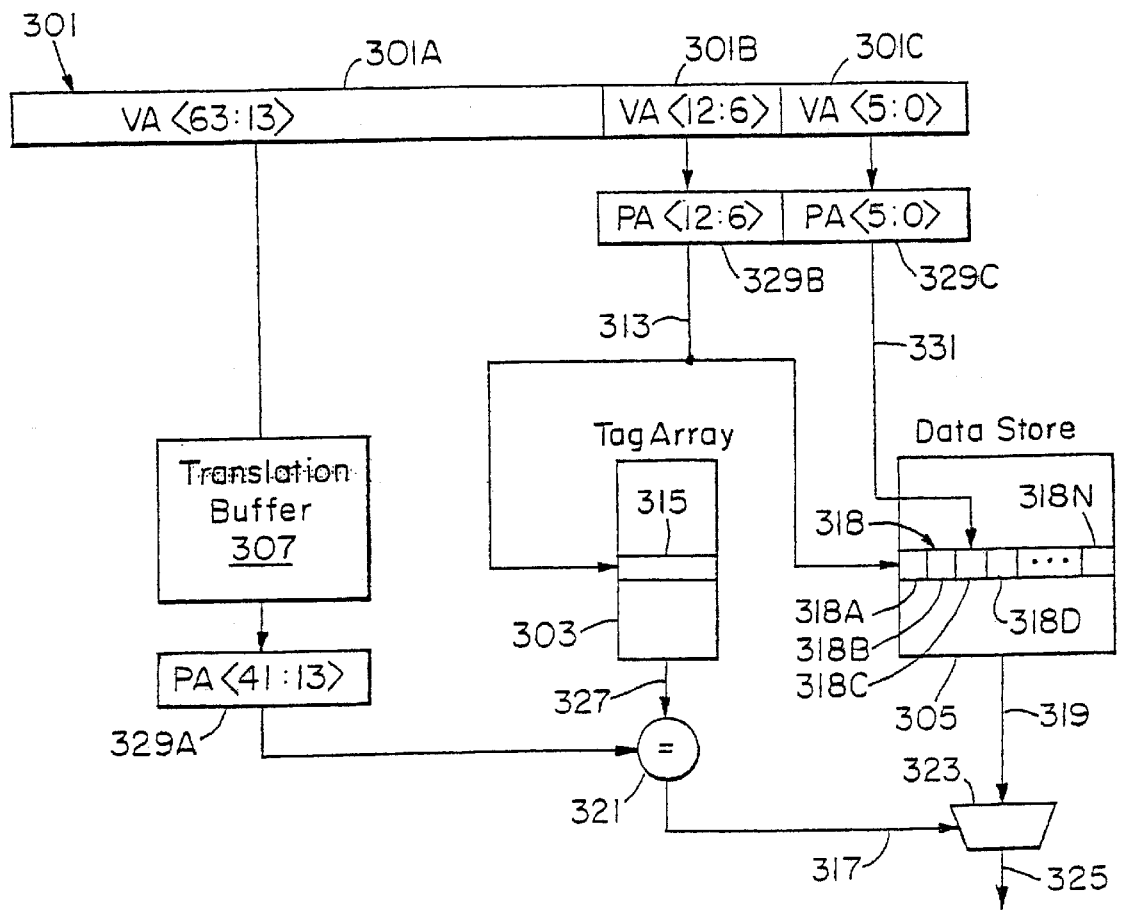
FIG. 1 is a block diagram of a prior art physically-tagged, physically-indexed data cache.

FIG. 1 is a block diagram demonstrating a prior art physically-tagged, physically-indexed data caching system comprising a translation buffer 307 and a data cache which itself comprises high-speed memory split into two parts: a data store 305 and a tag array 303. The primary task of the tag array 303 is to provide tag information to determine cache hits or misses.

Virtual address space is typically broken up into pages, the high order bits of a virtual address 301 defining a virtual page address 301A, and the low-order bits defining an index 301B and offset 301C respectively within the page. The virtual page address 301A is mapped to a physical page address 329A by the translation buffer 307. The index 301B and offset 301C are not mapped and are thus essentially both virtual and physical. Each tag array location 315 corresponds to one block 318 of sixty-four bytes in the data store 305. Therefore, the index 313 comprises only the bits 329B required to address a block of data.

Each value of the index 313 references some location in the tag array 303, for example location 315. The tag array 303 provides the tag 327 stored in location 315 upon presentation of the respective value of index 313. At the same time, the index 313 is used to reference the corresponding block 318 of data held in the data store 305. The offset 331 selects a particular location 318C within the block 318. The data stored in location 318C appears at the data store output 319, along with a valid bit (not shown).

At the same time the tag array is referenced, the virtual page address 301A is translated by the translation buffer 307, so that no extra delay is caused by the translation. The value of the tag array output 327 is compared, at comparator 321, with the physical page address 329A from the translation buffer 307. If there is a match and the corresponding valid bit is set (a cache hit), the retrieved data 319 is valid and passed by gate 323 as valid data 325. Otherwise there is a cache miss and the data must be retrieved from main memory.

Figure 2A:
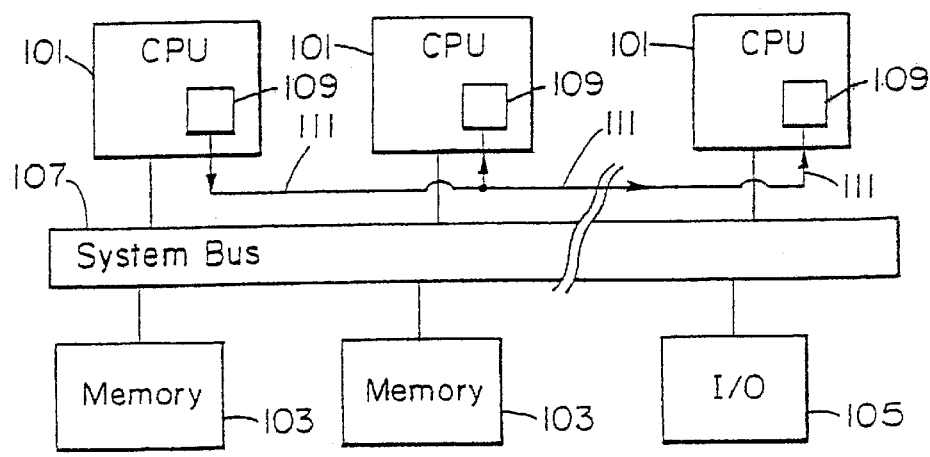
FIG. 2A is a block diagram of a typical multiprocessor computer system.

FIG. 2A is a block diagram of a typical multiprocessor computer system. Several processors (CPUs) 101 are linked to main memory modules 103 and I/O modules 105 through a system bus 107. While every location in main memory has a unique physical address, modern CPUs typically use virtual addressing techniques in order to make available a virtual address space which can be larger or different than actual available physical memory.

Figure 2B:
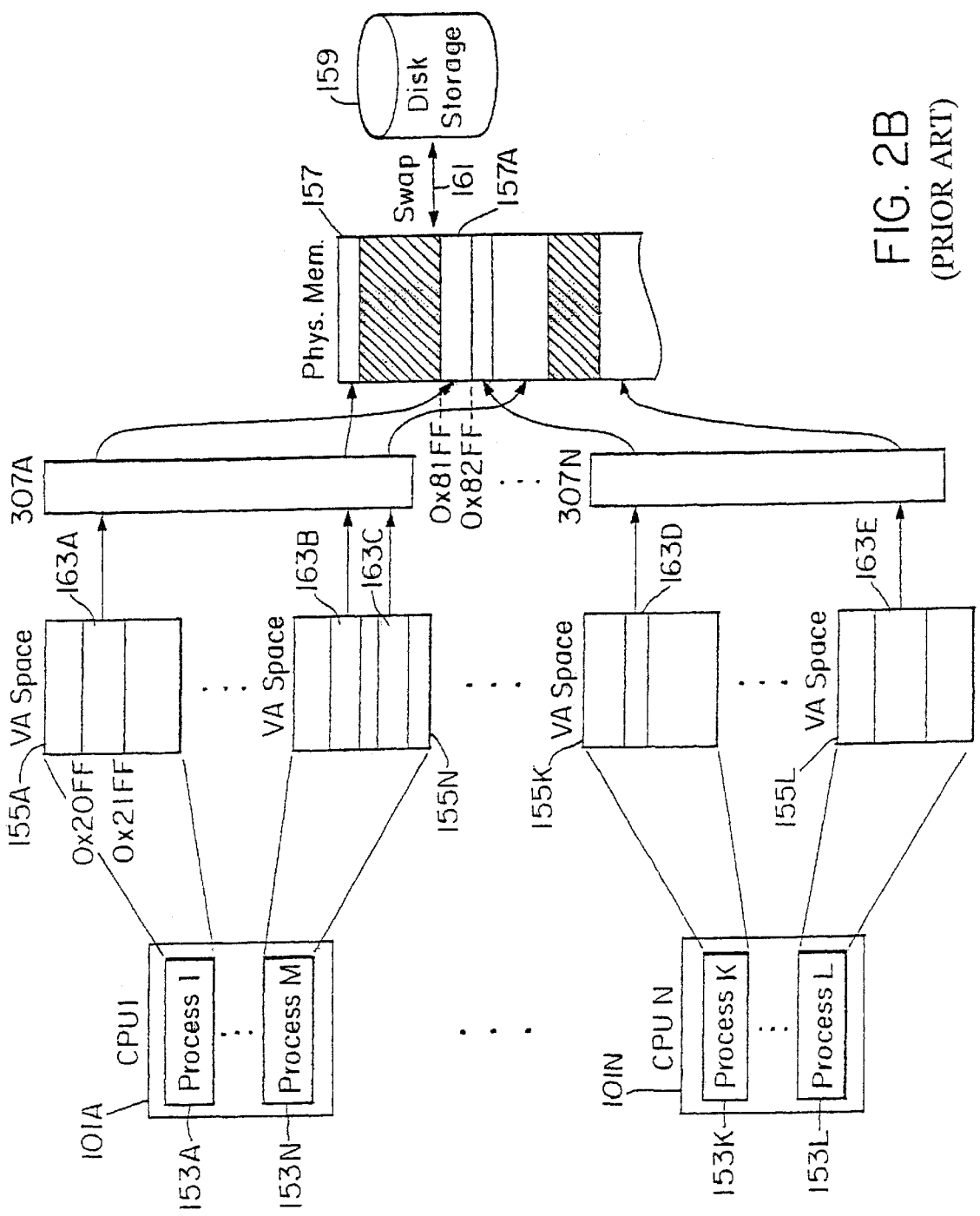
FIG. 2B is a block diagram demonstrating virtual addressing in the multiprocessor system of FIG. 2A.

FIG. 2B demonstrates the principle of virtual addressing in a N-processor system. Typically, each CPU 101A–N has several processes running at any given time. For instance, CPU 101A is executing Processes 1 through M. CPU 101N is running Processes K through L. Typically, each process 153 running on each CPU 101 has its own virtual address space 155, which except in special circumstances such as shared memory, is independent of other processes' virtual spaces.

At any given time, only some subset 163 of each virtual address space 155 is physically in main memory 157. As a specific example, memory block 163A in the virtual address space 155A of Process 1 153A of CPU 1 151A, having a virtual address range of 0x20FF to 0x21FF is mapped to physical memory block 157A having a physical address range of 0x81FF to 0x82FF. When data is needed that is not in physical memory, it is swapped in from disk storage 159 by a swapper 161.

Each CPU 101 has a hardware-based translation buffer 307 that maps virtual addresses to the physical memory addresses that hold the desired data. Typically, the translation buffers 307 are integrated within their respective CPUs.

In a multiprocessor system as shown in FIG. 2A, during a main memory reference, the caches of all CPUs must be checked to ensure the data is not owned by another CPU, which could result in data incoherency. This is accomplished by sending probes from the referencing CPU to the other CPUs, typically over the system bus 107. A probe is a query to determine if any other CPU owns, or controls, a block of data. FIG. 2A shows a probe 111 being sent from one CPU to the other CPUs in the system. Because the CPUs have no knowledge about other CPUs' virtual address space mappings, probes use physical addresses.

Figure 3:
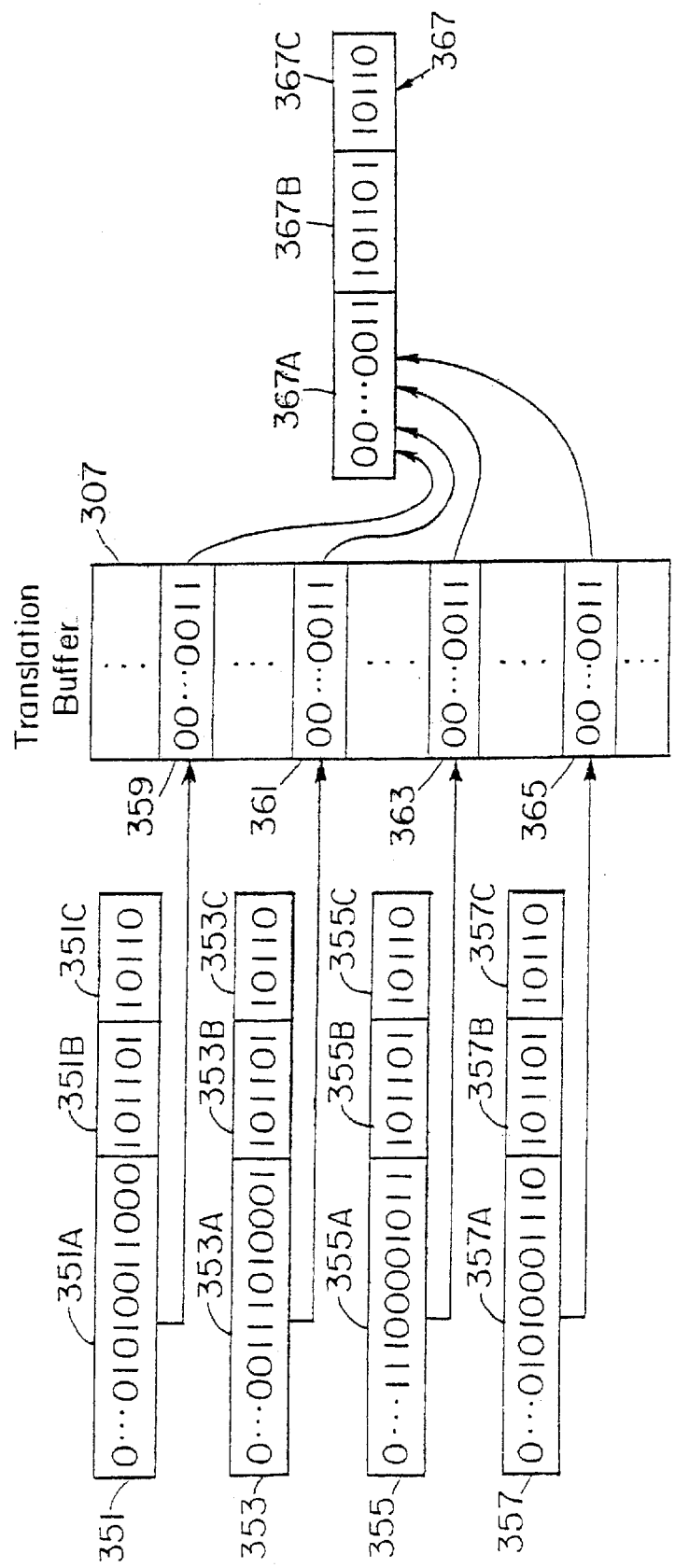
FIG. 3 is a block diagram of a translation buffer demonstrating how several virtual addresses can map to the same physical address.

As FIG. 3 demonstrates, several virtual addresses 351–357 can map to the same physical address. Typically, the translation buffer 307 holds the physical page address at locations indexed by corresponding virtual page address. Using binary digits, virtual address 351 has a virtual page address 351A of 00 . . . 01011011000. The corresponding location 359 in the translation buffer 307 happens to hold the physical page address 00 . . . 0011, meaning that virtual page address 00 . . . 01011011000 has been mapped to physical page address 00 . . . 0011. In the example of FIG. 3, three other virtual page addresses (ref. numbers 353, 355 and 357) are also mapped by the translation buffer to physical page address 00 . . . 0011.

Figure 4:
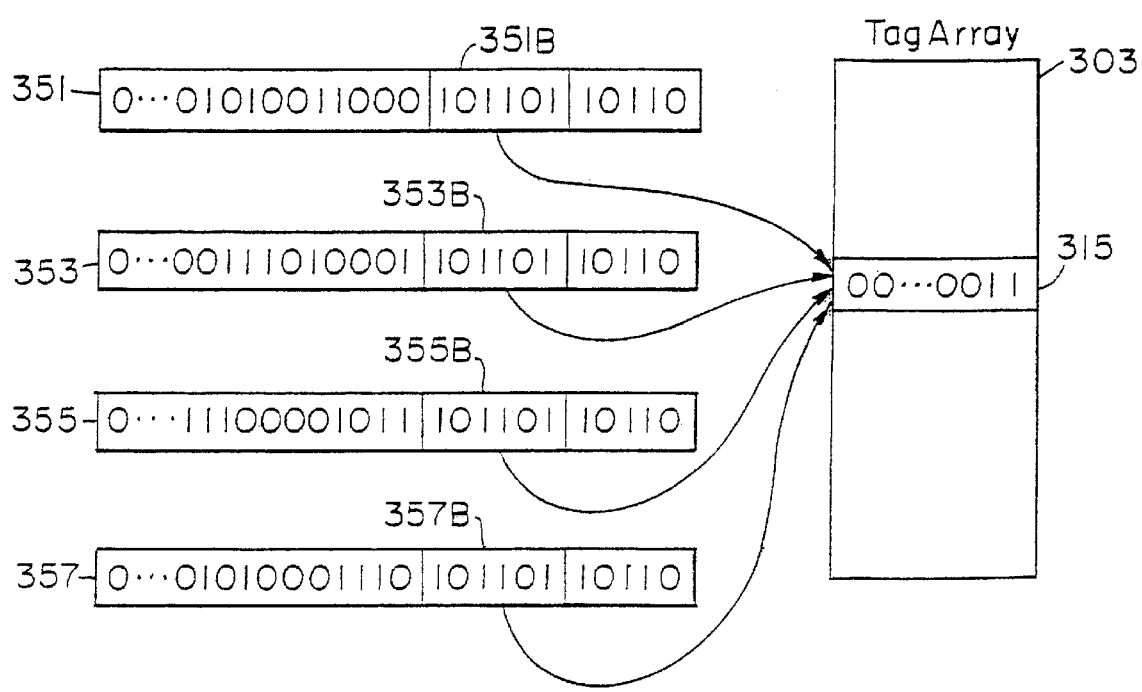
FIG. 4 is a block diagram demonstrating how, in a physically-tagged, physically-indexed tag array different virtual addresses which map to the same physical address refer to the same tag array entry.

In the physically-tagged tag array of FIG. 4, the physical page address 367A (of FIG. 3) is the tag stored in locations in the tag array 303 indexed by the index portions 351B–357B of the respective addresses, which as discussed above, are unmapped and therefore both virtual and physical. Thus, the four virtual addresses of FIGS. 3,4, 351–357, all index the same location 315 in the tag array, because they all have the same index value: 101101. Now, when any one of these virtual locations is referenced, because they all point to the same place in the tag array, it receives the correct tag information.

In the data cache system such as that described in FIGS. 1–4, the cache itself is physically indexed. This means the cache is limited to $2^{13}$ locations where 13 is the number of bits in the index and offset. In modern microprocessors, data cache lookup is one of the core time-critical steps which determine the overall cycle-time of the machine. A larger cache reduces lookup latency, but this presents new problems. The larger the cache, the more bits are required to address it.

Figure 5:
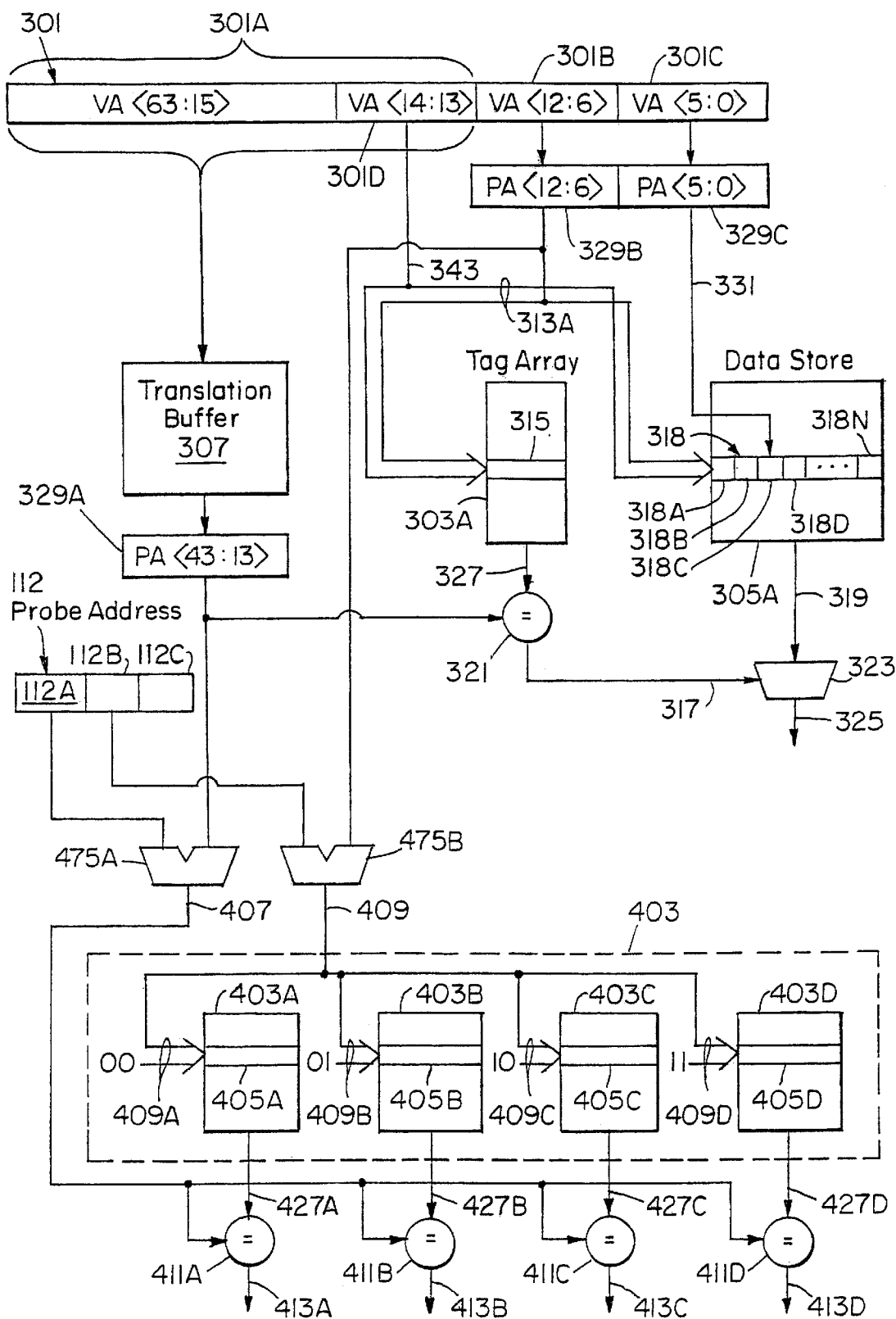
FIG. 5 is a block diagram of a physically-tagged, virtually-addressed data cache system, with a duplicate tag array of the present invention.

FIG. 5 illustrates a physically-tagged, virtually-addressed data cache system, in which the tag array index 313A comprises virtual bits 343. Tag array 303A uses the index 313A to check for a cache hit. If no hit is found, the duplicate tag array 403 substitutes other values for bits 301D.

As in the embodiment illustrated in FIG. 1, the virtual address 301 from the CPU core comprises the virtual page address 301A and the unmapped index 301B and offset 301C. Also similarly, the virtual page address 301A is sent to a translation buffer 307 for conversion to the physical page address 329A and the unmapped index bits 301B and offset 301C are transmitted to the tag array 303A and the data store 305A as an index in a look-up process. In order to increase the size of the data store, however, virtual bits 13 and 14 (see reference numeral 301D) are also concatenated with the unmapped bits to look into the tag array and data store. This results in a fifteen-bit data store index. Using virtual bits as a look up into a physically indexed tag array and data store never results in a false indication of a cache hit. This is because virtual address bits 13 and 14 are also passed to the translation buffer and the translated physical page address 329A is compared by comparator 321 to the physical page address that is issued from the tag array 303A. In contrast, however, it will sometimes occur that the system will indicate a cache miss when the data in fact resides in the cache. This will occur when virtual address bits 13 and 14 and physical address bits 13 and 14 differ from each other. This false cache miss will occur because using the virtual address bits instead of the physical address bits to look into the tag array causes the system to look in the wrong location for the data with the wrong index. This eventuality is compensated for by the additional inclusion of a duplicate tag structure 403.

In the case of a cache miss, the virtual address bits <12:6> 301B are sent to the duplicate tag array 403, concatenated with the four separate combinations of virtual address bits VA <14:13> 409A–409D and sent in parallel to four separate tag arrays 403A–403D respectively. The page addresses issued from each of these tag arrays are then compared to the translated page address 329A in four comparators 427A–427D respectively. In this way, the system, in the event of a cache miss, checks all possible combinations of the virtual address bits <14:13> to ensure that the data does not reside in the data store.

According to the invention, the duplicate tag array 403 is also used to perform probe processing to enable other CPUs to determine whether or not the CPU has ownership over data by possessing it in its data store. A physical probe address 112 comprising a physical page address 112A, index 112B and off-set 112C, passes through selectors 475A and 475B. 475B provides the index portion of the probe address 112B as the index into tag arrays 403A–403D. Since the system of the four parallel tag arrays looks up a duplicate tag entry for every combination of bits <14:13>, only bits <12:6> of the probe address are used. The page portion of the probe address 112A is then compared to the output of the tag arrays 403A–403D in comparators 427A–427D to indicate whether or not the data resides in the data store.

In summary, the system according to the present invention allows for larger data stores by increasing the size of the number of bits used in text data store by two bits in the preferred embodiment. Additionally, the use of the duplicate tag array allows probe processing to take place without contention for the primary tag array 303A. The only contention occurs in the simultaneous incidence of a potential cache miss either due to the non-existence of the data in the data store or where virtual address bits <14:13> differ from physical address bits <14:13> and the simultaneous occurrence of a probe to be processed. In this case, there will be some contention for the duplicate tag array.

In a preferred embodiment, the data cache is a 2-way set associative cache. More generally, the data cache can be an n-way set associative cache for any number n. The above discussion applies equally for any value of n.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. In a multiprocessor system comprising a main memory and a plurality of processors that contend for access to the main memory via a common bus, each of said processors having an associated data caching system a data caching system comprising:

a virtually-addressed data store for caching data from the main memory for access by the associated processor;

a virtually-addressed primary tag array for holding physical tags associated with data cached in the data store;

an address translator that maps virtual page addresses to physical page addresses;

a first comparator to compare a physical page address, translated from a virtual address by the address translator, with a physical tag produced by the primary tag array responsive to the virtual address, a match indicating a cache hit;

a duplicate tag array, comprising a plurality of secondary tag arrays, for holding copies of the tags held in the primary tag array, each secondary tag array being referenced by a common physical address portion concatenated with a unique value, wherein the secondary tag arrays are simultaneously referenced; and a plurality of second comparators, each second comparator associated with respective secondary tag array, each second comparator comparing the translated physical page address with a physical tag produced by its associated secondary tag array responsive to the concatenated physical address portion and unique value, a match indicating a hit in the data store at a location referenced by the concatenated physical address portion and unique value, wherein the primary tag array remains available to its associated processor's core while the duplicate tag array is accessed by a physical-address probe sent from another processor of the multiprocessor system.

2. The data caching system of claim 1, wherein the data store comprises a plurality of blocks for caching data;

the primary tag array comprises a plurality of locations for holding the tags, each location corresponding to a data store block such that a tag location and its corresponding data store block are referenced by an index portion of a memory address associated with data cached in the data store block, the memory address comprising a page address and an index portion, and each tag comprising the page address of the memory address; and the duplicate tag array comprises a plurality of locations, each location holding a copy of the tag stored in a corresponding primary tag array location and being referenced by the same index upon a primary cache miss, and being referenced only by a portion of a physical address provided by a probe upon a probe request.

3. The data caching system of claim 2, wherein each data store block comprises sixty-four byte, each byte within a block being referenced by an offset portion of a memory address.

4. The data caching system of claim 2, further comprising:

an address translator mapping virtual page addresses to physical page addresses, and wherein each primary tag array location and its corresponding data store block is referenced by an unmapped index portion of a virtual address, each tag comprises a physical page address associated with data cached in the corresponding data store block, the primary tag array comparator compares a physical page address mapped by the address translator from a virtual page address with a tag indexed by the index portion of the virtual address, each duplicate tag array location is referenced by the same unmapped index portion of a virtual address as its corresponding primary tag array location, and the duplicate tag array comparator compares a physical page address with a tag read from a duplicate tag array location indexed by the index portion of the virtual address.

5. The data caching system of claim 1, further comprising:

a substitution means for substituting various values in place of the virtual page address portion of the index.

6. The data caching system of claim 1 wherein a virtual address comprises sixty-four bits and a physical address comprises forty-three bits, the tag array being indexed by two virtual page address bits and seven unmapped index bits.

7. In a multiprocessor system comprising a main memory and a plurality of processors that contend for access to the main memory vai a common bus, a method of caching data in one of the processors, comprising:

mapping a virtual page address of a virtual address to a physical page address;

storing caching data from a main memory in a virtually-addressed data store;

holding physical tags in a virtually-addressed primary tag array, the tags being associated with the data cached in the data store;

comparing a mapped physical page address with a physical tag produced by the primary tag array responsive to the virtual address, a match indicating a hit;

holding copies, in a duplicate tag array having a plurality of secondary tag arrays, of physical tags held in the primary tag array, each secondary tag array being referenced by a common physical address portion concatenated with a unique value, wherein the secondary tag arrays are simultaneously referenced;

comparing the mapped physical page address with a physical tag produced by a secondary tag array responsive to the concatenated physical address portion and unique value, a match indicating a hit in the data store at a location referenced by the concatenated physical address portion and unique value;

receiving a probe having a physical address sent from another processor in the multiprocessor system; and comparing the probe's physical page address with physical tags produced by the secondary tag arrays responsive to the concatenated physical index address portion of the probe's physical address and associated unique values, a match indicating a hit in the data store at a location referenced by the concatenated physical address portion and the unique value causing the hit.

* * * * *